(No Model.)
W. K. HODGMAN & N. H. CHENEY.
RACK TOOTH.
No. 364,926. Patented June 14, 1887.
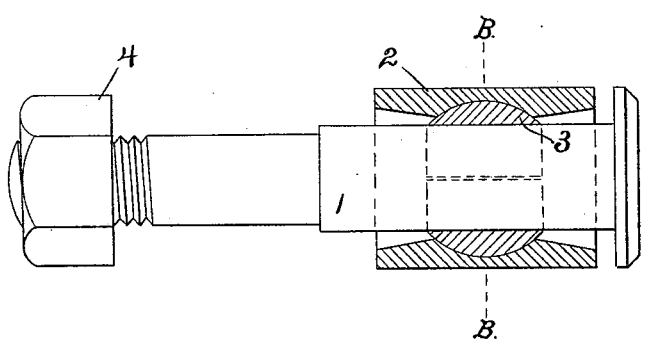
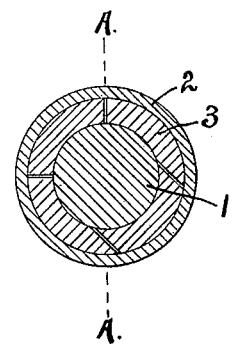
WITNESSES.
B. Huber.
Edward P. Coleman.
INVENTORS.
Willis K. Hodgman.
Norman H. Cheney.

United States Patent Office.

WILLIS K. HODGMAN AND NORMAN H. CHENEY, OF TAUNTON, MASSACHUSETTS, ASSIGNORS TO THE HUBER PRINTING PRESS COMPANY, OF SAME PLACE.

RACK-TOOTH.

SPECIFICATION forming part of Letters Patent No. 364,926, dated June 14, 1887.

Application filed November 26, 1886. Serial No. 219,896. (No model.)

*To all whom it may concern:*

Be it known that we, WILLIS K. HODGMAN and NORMAN H. CHENEY, both of Taunton, county of Bristol and State of Massachusetts, have invented an Improvement in Rack-Teeth, of which the following description, in connection with the accompanying drawings, is a specification, like figures on the drawings representing like parts.

This invention has for its object the improvement of the end teeth of the reversing-rack, used in that class of mechanical movement commonly known as the "Napier motion."

In the mechanical movement patented by Berthold Huber and Willis K. Hodgman, dated August 24, 1886, No. 348,162, the end teeth of the rack therein shown are composed of shouldered bolts, attached to the rack by nuts, and provided with sleeves $b^3$, which are of substantially oval form, and are shorter than the bolts outside the said central guide, in order that the said sleeves may slide as well as rotate, as the reversing-gear, to be described, passes from the upper to the lower side of the rack, or vice versa. Our improvement consists in making the said sleeve in two parts, the inner part being made in the form of a sphere and arranged to embrace and slide on a bolt, and the outer part being made in the form of a cylinder and arranged to embrace and rock on the spherical inner part.

Figure 1 is a longitudinal section of a rack-tooth embodying our invention, on line A A, Fig. 2. Fig. 2 is a section on line B B, Fig. 1.

The spherical part 3 of the tooth is made in four pieces, cut, as shown in Fig. 2, so it can be placed in its hollow bearing in the cylindrical part 2. The bolt 1 is held in position by the nut 4.

Operation: When the tooth is engaged by the reversing-gear, in passing from the upper to the lower side of the rack it accommodates itself, as shown, to the rocking and sliding motion of the said gear, thereby greatly reducing wear between the stud and reversing-gear.

Having fully described our invention, what we claim, and desire to secure by Letters Patent, is—

1. A rack-tooth composed of a stud or bolt fitted with a sleeve made in two parts, the inner part being in the form of a hollow sphere and arranged to slide and turn on the stud, and the outer part being in the form of a hollow cylinder and arranged to rock on the spherical inner part, all combined substantially as described, for the purpose specified.

2. The combination of the stud 1 with the loose sleeve formed of the portions inclosed one within the other, as set forth.

WILLIS K. HODGMAN.
NORMAN H. CHENEY.

Witnesses:
B. HUBER,
E. P. COLEMAN.